United States Patent [19]
Wilensky et al.

[11] 4,330,779
[45] May 18, 1982

[54] DISPLAY ANALYZER HAVING ANGULAR DEGREES OF FREEDOM

[75] Inventors: Barry F. Wilensky; Joseph A. Maggi, both of Brooklyn, N.Y.

[73] Assignee: The Bendix Corporation, Teterboro, N.J.

[21] Appl. No.: 184,869

[22] Filed: Sep. 8, 1980

[51] Int. Cl.³ ............................................. G09G 1/00
[52] U.S. Cl. .................................. 340/705; 358/101; 358/107; 356/401
[58] Field of Search ...................... 358/101, 103, 107; 340/705; 356/401

[56] References Cited

U.S. PATENT DOCUMENTS

| | | | |
|---|---|---|---|
| 2,506,127 | 5/1980 | Allen | 358/103 |
| 3,261,967 | 7/1966 | Rosin et al. | 358/101 |
| 3,532,807 | 10/1970 | Webb | 358/101 |
| 4,034,362 | 7/1977 | Balanca | 358/107 |
| 4,168,430 | 9/1979 | Denis et al. | 358/101 |
| 4,212,031 | 7/1980 | Schmitt | 358/101 |
| 4,232,456 | 11/1980 | Harmon et al. | 358/107 |

*Primary Examiner*—Marshall M. Curtis
*Attorney, Agent, or Firm*—Anthony F. Cuoco; Thomas L. Adams

[57] ABSTRACT

A display analyzer analyzes an image from a unit (10) under test. The analyzer has a carriage (18, 20) for adjustably supporting a detection device (16). The carriage has at least two degrees of freedom. The detection device has a given field of view and can produce a viewing signal responsive to the image size and brightness within the field of view. This viewing signal is produced with a predetermined characteristic in response to the appearance of a given image at the center of said field of view. The display analyzer also has an analyzing device (50) for producing a carriage adjustment signal. The carriage is operable to move in response to this adjustment signal. The analyzing device is operable to produce information in response to the production of the viewing signal.

16 Claims, 3 Drawing Figures

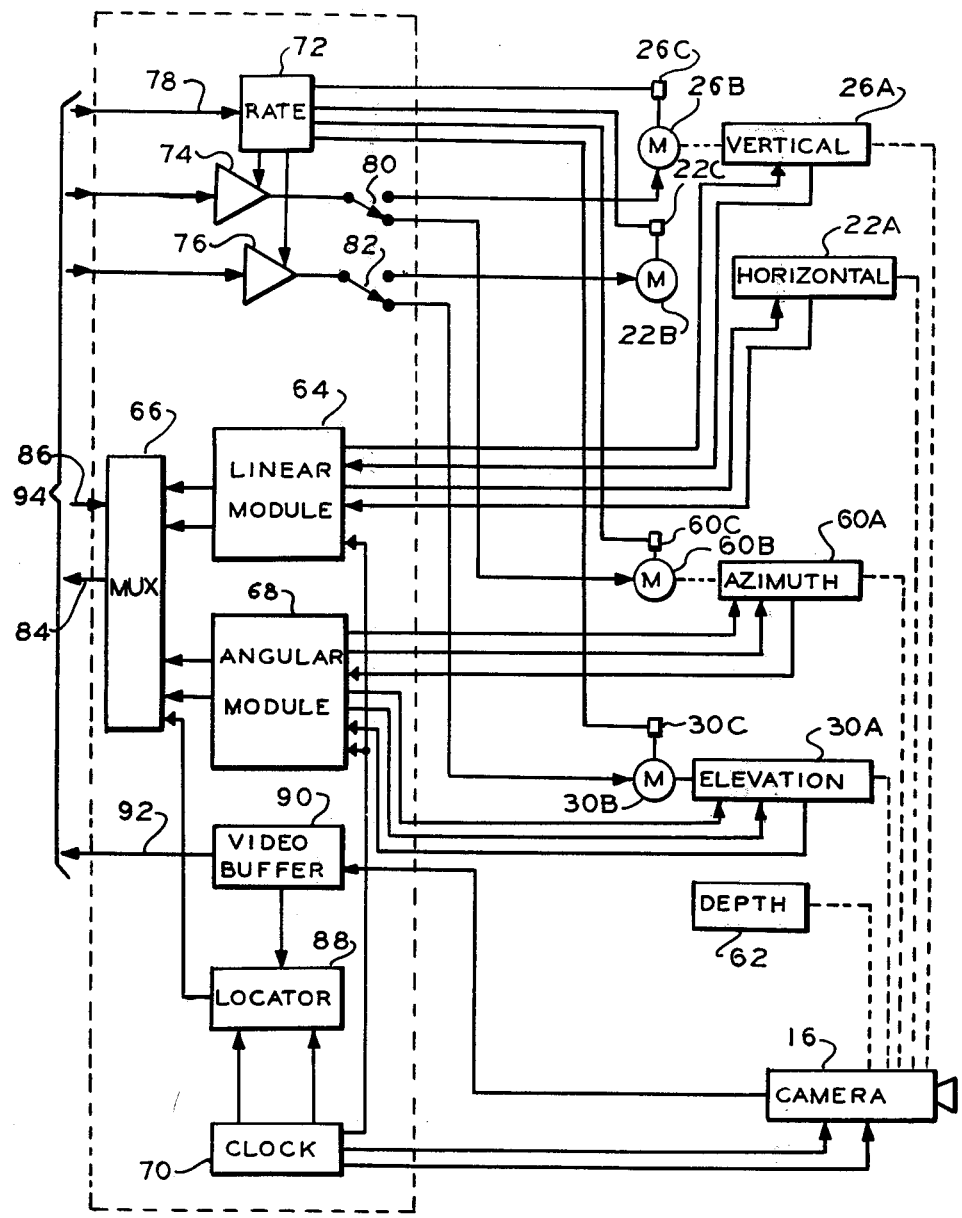

DISPLAY ANALYZER HAVING ANGULAR DEGREES OF FREEDOM

BACKGROUND OF THE INVENTION

The present invention relates to display analyzers and in particular to display analyzers including light detecting means to move with at least four degrees of freedom.

Complex visual images are readily produced on cathode ray tubes by using commonly available circuitry. It has therefore become important to test such equipment by verifying that the appropriate image is being displayed for the purpose of production testing, field testing or repair. The straight forward-approach of producing various images and having an operator measure its position and shape is time consuming and tedious. The basic problem with the latter approach is the great amount of manual intervention it requires.

A known video device having limited resolution stores picture information on a semiconductor substrate. This video device has been used to observe production units and determine whether one of their dimensions is proper. However, these devices are not able to observe and analyze various images on a screen that may appear in different locations. In particular, these systems do not pan to locate a specific image and are not concerned with its brightness.

Accordingly, there is a need for an accurate device involving a minimum of manual intervention or visual observation by an operator, that can quickly determine whether the image displayed by a unit under test is proper.

SUMMARY OF THE INVENTION

In accordance with the illustrative embodiments demonstrating features and advantages of the present invention, there is provided a display analyzer for analyzing an image from a unit under test. The analyzer includes a detection means, a carriage means, and an analyzing means. The detection means has a given field of view and can produce a viewing signal responsive to the image size and brightness within the field of view. This viewing signal is produced with a predetermined characteristic in response to the appearance of a given image at the center of the field of view. The carriage means is operable to adjustably support the detection means. The analyzing means is connected to the detection means for producing a carriage adjustment signal. The carriage means is operable to move in response to the adjustment signal. This analyzing means is also operable to produce information in response to production of the viewing signal.

Also in accordance with the present invention there is provided a method for analyzing a display image from a unit under test with the output signal of a detection device having a given field of view. The method includes the step of measuring the position of the detection device. The method also includes the step of determining if the output signal of the detection device satisfies a predetermined standard.

In a preferred embodiment the detection device is a video camera mounted on a carriage to move vertically, horizontally, in elevation and in azimuth. Preferably these positional adjustments are performed by servos employing position feedback so that camera position can be accurately controlled. In this embodiment the camera can direct its field of view toward a projector which produces an alignment target. Accordingly, positional measurements can be made with respect to a known reference. It is also anticipated that for some embodiments, the camera may be adjustable in the same direction as the direction of its field of view to accomplish focusing.

The azimuthal and elevational adjustments are important for analyzing virtual images appearing at infinity, since horizontal and vertical adjustments would be ineffective. This angular adjustment is also important for analyzing images produced by a "heads up display" conventionally produced in front of an aircraft windshield on an inwardly tilted glass screen through which the pilot can look. Such displays can employ a photocell that dims or brightens the displayed image in accordance with the ambient light. For this reason, some embodiments will employ a sequentially adjusted light source to stimulate this photocell to control the brightness of the display. Furthermore, such embodiments can include a brightness transfer standard for calibrating the intensity of the light source.

The preferred embodiment employs a microcomputer which analyzes the video data produced by the camera to determine if the images viewed fit a predetermined pattern. Accordingly, the microcomputer can cause the camera carriage to sweep the display until it finds the character being sought. Once found, the position of the character is compared to a preset positional standard to determine if the display is operating properly. Alternatively, the system can direct the camera into a predetermined viewing position and determine if the character being sought lies within that field of view. By employing apparatus of the foregoing type, the patterns of various characters can be stored within the microcomputer memory for comparison.

BRIEF DESCRIPTION OF THE DRAWINGS

The above brief description as well as other objects, features and advantages of the present invention will be more fully appreciated by reference to the following detailed description of presently preferred, but nonetheless illustrative embodiments in accordance with the present invention when taken in conjunction with the accompanying drawings wherein:

FIG. 3 is a more detailed schematic illustration of a portion of the analyzer of FIG. 2.

DETAILED DESCRIPTION OF THE PREFERRED EMBODIMENT

Figure 1:
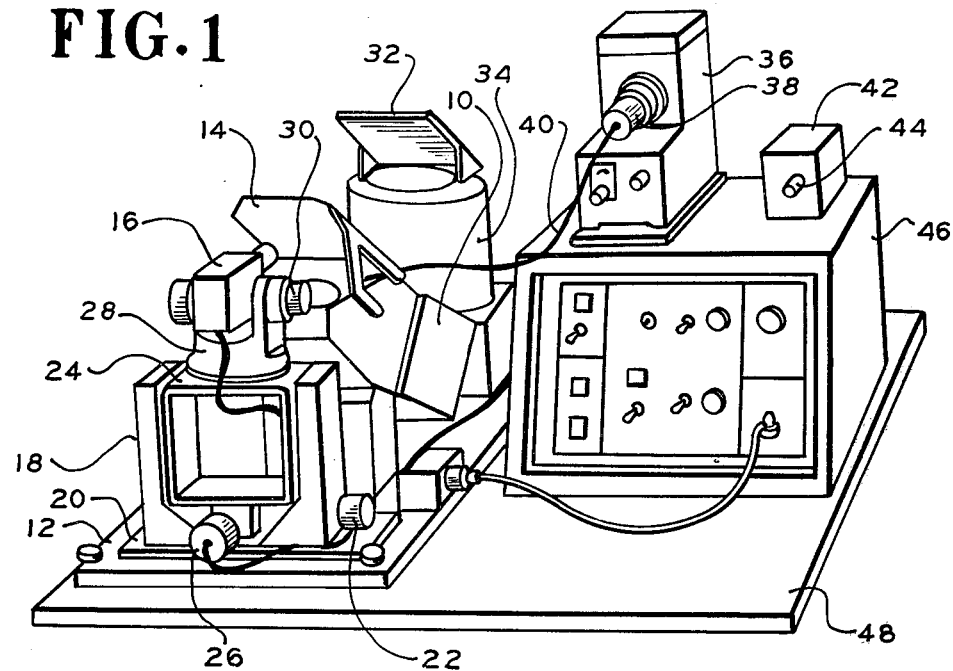
FIG. 1 is a perspective view of a portion of a display analyzer according to the present invention.

In FIG. 1, a unit under test 10 is shown mounted on a test bed 12. Unit 10 is a device having a cathode ray tube which upwardly projects onto glass screen 14 a virtual image which appears to be at infinity. Unit 10 is commonly referred to as a "heads up display" mounted in front of the windshield of a cockpit so the pilot can simultaneously look through the windshield and through glass screen 14. Unit 10 employs a sensor (not shown) which responds to ambient light to adjust the intensity of the image displayed on screen 14.

A detection means is shown herein as camera 16, a video device having a resolution of 1000 pixels (picture elements). Camera 16 is of the charge storage type where a photosensitive semiconductor substrate is used to develop a charge profile signifying the viewed image. It is to be appreciated that instead of the foregoing type of camera a conventional broadcast television camera or an array of photocells can be employed, depending upon the required resolution and field of view.

Camera 16 is shown mounted on a carriage means comprising a yoke 18 attached to slidably mounted bed 20. Bed 20 can slide toward and away from unit 10, that is, in a direction parallel to the field of view of camera 16. In this embodiment the sliding adjustment of bed 20 is performed manually, although in other embodiments it may be performed automatically through servos. Yoke 18 is horizontally movable along bed 20 in a direction transverse to unit 10 (right to left in this view). This transverse motion is accomplished by a combination servo and position transducer 22 which drives an internal lead screw (not shown) within yoke 18. Slidably mounted within yoke 18 is frame 24. Frame 24 is vertically adjusted by means of a combination servo and position transducer 26, which drives a lead screw (not shown) to elevate frame 24. Mounted atop frame 24 is a pedestal 28 which has a generally cylindrical shape and a pair of upwardly projecting ears onto which camera 16 is rotatably mounted. Pedestal 28 is hollow and has mounted within it a combination servo and position transducer (schematically illustrated hereinafter) similar to units 22 and 26. Pedestal 28 is rotated about a vertical axis by its internal servo to affect azimuthal translation of camera 16. Camera 16 is also rotatably mounted on the ears of the pedestal 28 to allow adjustment in elevation. This adjustment in elevation is performed by a combination servo and position transducer 30 which is similar to units 22 and 26.

Mounted on bed 12 behind unit 10 is a projector means, shown herein as projector 34 which projects an alignment target onto inclined glass screen 32, a screen similar to screen 14. In this embodiment, the alignment target on screen 32 has a virtual position out at infinity.

A light source is shown herein as lamp unit 36 which contains a tungsten-halogen lamp focused through a condenser lens. The intensity of light source 36 can be altered by a plurality of quartz diffusers mounted in electromechanically actuatable turret 38. Turret 38 can be actuated by a microcomputer (illustrated hereinafter). The light from source 36 is delivered through fiber optic light pipe 40. Light pipe 40 is shown attached to the ambient light sensing photocell on unit 10 to simulate a varying ambient light.

Light calibrator 42 has an input lens 44 adapted to receive the end of light pipe 40 for measuring its intensity. Calibrator 42 acts as a light transfer standard having a relatively high degree of accuracy.

The foregoing equipment is electrically connected through interface panel 46 to computing and other equipment (described hereinafter) located below table 48.

Figure 2:
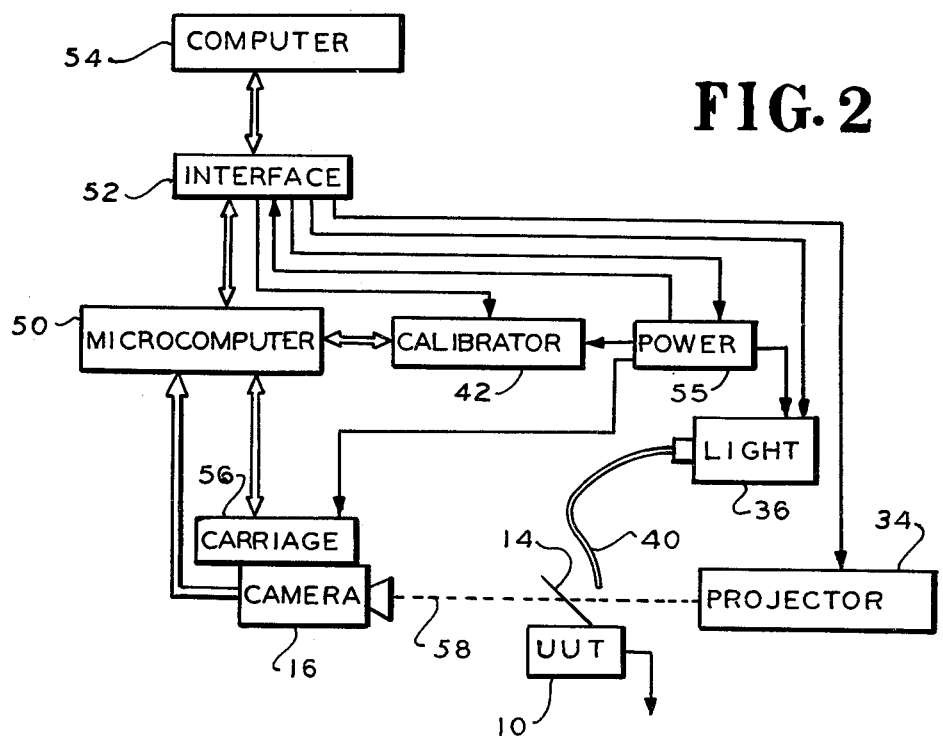
FIG. 2 is a schematic illustration of a display analyzer according to the present invention.

Referring to FIG. 2, an analyzing means is shown herein as microcomputer 50 which interfaces by means of interface device 52 with an optional time-shared computer 54. Microcomputer 50 exchanges digital data with carriage 54 which is the adjustable apparatus mounted upon bed 20 of FIG. 1. Microcomputer 50 also receives data from previously illustrated camera 16. Previously illustrated calibrator 42 is shown connected to microcomputer 50 to exchange digital data therewith. Previously illustrated projector 34 is connected to receive signals from interface 32 and the above light source 36 is connected to receive signals from interface 52. The field of view of camera 16 is suggested by dotted line 58 through screen 14 of previously illustrated unit 10 into projector 34.

Power supply 55 has two lines for exchanging signals with respect to interface 52. Power supply 55 supplies an alternating current reference signal to carriage 56 to power its servos and position transducers. Supply 55 also provides adjustable power to calibrator 42 and light source 36.

Referring to FIG. 3 a more detailed schematic illustration is given of carriage means 56 of FIGS. 1 and 2. Previously mentioned position transducers are shown herein as vertical position transducer 26A, horizontal position transducer 22A, azimuthal position transducer 60A, and elevation transducer 30A. These position transducers are shown mechanically coupled to previously illustrated camera 16 to move it. The previously mentioned manual adjustment of camera 16 along a direction parallel to its line of sight is schematically illustrated by manual depth adjustment knob 62. Transducers 22A, 26A, 30A, and 60A are in this embodiment linearly variable differential transformers, although in other embodiments other transducers such as potentiometers may be employed instead. Transducers 26A and 22A each have an input and output line connected to linear module 64. Module 64 includes conventional circuitry for converting the signals from transducers 22A and 26A to signals proportional to displacement that are multiplexed through multiplexer 66. Similarly, transducers 60A and 30A each have a pair of input lines and a single output line connecting to angular module 68. Module 68 also converts the signals sensed by transducers 30A and 60A to a signal that is multiplexed through multiplexer 66. Modules 64 and 68 are connected to clock 70 to receive a timing signal for synchronizing the converted data.

Transducers 22A, 26A, 30A and 60A are mechanically coupled to servo motors 22B, 26B, 30B and 60B, respectively. Motors 22B, 26B, 30B and 60B employ conventional rate feedback sensors 22C, 26C, 30C and 60C, respectively. These rate sensors each have an output line connected to rate circuit 72. Rate circuit 72 applies a rate feedback signal to traverse amplifiers 74 and 76 whose outputs are connected to the poles of switches 80 and 82, respectively. Switch 80 feeds back to either servo 26B or 60B and switch 82 feeds back to either servo 22B or 30B, signals to regulate motor speed. Rate circuit 72 applies rate feedback signals to traverse amplifier 74 and 76 which signals correspond to the rate of the servo selected to operate by switches 80 and 82, respectively. The rate feedback signals from rate circuit 72 are error signals proportional to the difference between the transducer input signals applied to rate circuit 72 and an internal reference determined by a digital signal applied to rate circuit 72 on line 78. Traverse amplifiers 74 and 76 can be disabled by an on/off signal applied to their inputs. The inputs applied to amplifiers 74 and 76 and rate line 78 are transmitted from microcomputer 50 of FIG. 2.

Multiplexer 66 selects according to the selection signal on line 86 from microcomputer 50, one of the signals provided by module 64 or 68 and transmits it on time shared line 84. Multiplexer 66 similarly transmits on line 84 a digital signal from pixel locator 88 which signifies the location of the picture element being transmitted by camera 16. Clock 70 has two separate pairs of lines connected to locator 88 and camera 16 to synchronize them. Clock 70 has another output commonly connected to modules 64 and 68 to synchronize them. The video output of camera 16 is coupled to video buffer 90 which provides a video output on line 92.

The following group of lines, identified as group 94, is coupled to microcomputer 50: lines 78, 84, 86, 92, and the input lines to amplifiers 74 and 76. In this manner the microcomputer can monitor and control the operation of the equipment of FIG. 3.

To facilitate an understanding of the principles associated with the foregoing apparatus, its operation will be briefly described. Initially, an operator energizes the equipment so that light source 36 is powered and produces light from light pipe 40 (FIGS. 1 and 2). Light pipe 40 is then inserted into lens 44 of calibrator 42. Calibrator 42 transmits a calibration signal signifying the intensity of pipe 40 to microcomputer 50 (FIG. 2). Microcomputer 50 stores this datum as a conversion factor for video from buffer 90 (FIG. 3) to light intensity. Subsequently, light pipe 40 is reconnected to the photocell input of the unit under test 10, as illustrated in FIG. 1. Accordingly, light produced from source 36 stimulates the photocell of unit 10 so the intensity of its display is correspondingly controlled.

In this description it is assumed that switches 80 and 82 (FIG. 3) are in the positions shown so that servo motors 60B and 30B adjust the azimuth and elevation of camera 16. Angular adjustment is chosen since the images to be presently analyzed are virtual images at infinity. At this time the operator can adjust manual depth knob 62 to focus camera 16.

Projector 34 projects a reference target onto glass screen 32 to provide an alignment reference. Microcomputer 50 now directs carriage 56 (FIG. 2) to position camera 16 toward the expected position of this alignment reference, thereafter computer 50 pans carriage 56 until camera 16 is centered on the reference target. Once camera 16 has been so aligned the position sensed by transducers 30A and 60A (FIG. 3) are read into memory. Thereafter, position is determined by its displacement from this reference position.

Next, test unit 10 may be operated manually or by microcomputer 50, to display predetermined images at certain positions on screen 14. Accordingly, microcomputer 50 directs carriage 56 (FIG. 2) to position camera 16 along the expected line of sight to the character on screen 14. Microcomputer 50 verifies that the character projected by unit 10 is proper by checking that the pattern of video produced by camera 16, as positionally referenced by pixel locator 88 (FIG. 3), corresponds to a pattern stored in the memory of microcomputer 50. If camera 16 does not transmit video data fitting the pattern of the expected character on screen 14, microcomputer 50 pans carriage 56 and camera 16 until it finds and centers the expected character. Once found, the angular position of the character is stored into the memory of microcomputer 50. Also, at this time the magnitude of the video output from camera 16 is compared by microcomputer 50 to the permissible range of values stored in the microcomputer memory, thereby verifying that the intensity of the display is proper.

It is to be appreciated that microcomputer 50 allows for a selectable tolerance in the parameters being measured by camera and carriage.

The foregoing test sequence is repeated as the operating conditions of unit 10 are altered. Thus, unit 10 is subjected to different stimuli under various operational modes. For example, the intensity of light applied by pipe 40 to unit 10 is altered. If unit 10 has all tests satisfactorily completed, microcomputer 50 transmits through interface 52 (FIG. 2) to computer 54 a "go" signal indicating that unit 10 has performed properly. This completes the testing of unit 10.

It is to be appreciated that various modifications may be implemented with respect to the above described embodiments. For example, various computer programs may be implemented by microcomputer 50 and by computer 54. In these various programs, the order of execution of various operations can be resequenced. Also, the repetition rate at which these operations are repeated can be varied. It is also expected that in searching a unit, camera 16 may pan the entire range of its adjustments in a raster fashion to locate an expected character, instead of being directed a priori to the expected location of the character. Also, in some embodiments the camera carriage may continue to pan the unit under test even after the expected character has been found to determine if any extraneous characters are being improperly displayed. Furthermore, the mechanical panning of the camera may be provided by various carriages using different mechanical drives such as chains, belts and pulleys, rack and pinion etc. Also, various electronic components may be substituted depending upon the desired speed, capacity, power, memory, etc.

Obviously, many other modifications and variations of the present invention are possible in light of the above teachings. It is therefore to be understood that within the scope of the appended claims, the invention may be practiced otherwise than as specifically described.

What is claimed is:

1. A display analyzer for analyzing an image from a unit under test, comprising:
   a detection means having a given field of view for producing a viewing signal responsive to the image size and brightness within said field of view, said viewing signal being produced with a predetermined characteristic in response to the appearance of a given image at the center of said field of view;
   supporting means for adjustably supporting said detection means, said supporting means having at least two degrees of linear freedom and two degrees of angular freedom, the direction of said given field of view being angularly movable into alignment with said image of said unit under test; and
   analyzing means connected to said detection means for producing a supporting means adjustment signal, said supporting means being operable to move in response to said adjustment signal, said analyzing means being operable to produce information in response to production of said viewing signal.

2. A display analyzer according to claim 1 wherein:
   said supporting means has a carriage, said carriage including:
   at least two position transducers for measuring displacement with respect to the two linear degrees of freedom, said transducers applying a pair of transducer signals to said analyzing means.

3. A display analyzer according to claim 2, wherein:
   after production of said viewing signal said analyzing means is operable to determine that said transducer signals are within a given range of values before producing said information.

4. A display analyzer according to claim 2, wherein:

said analyzing means is operable to drive said supporting means to a position to cause production of said pair of transducer signals.

5. A display analyzer according to claim 1, wherein: said supporting means is operable to adjust the angular displacement of said field of view of said detection means about two orthogonal axes.

6. A display analyzer according to claims 2 or 5, wherein: said supporting means is operable to adjust the position in two orthogonal directions of said detection means without altering its angular displacement.

7. A display analyzer according to claim 2, wherein: said supporting means is operable to adjust the position of said detection means in the same direction as its field of view.

8. A display analyzer according to claim 2, further comprising: a projector means for projecting a visual reference target before said detection means.

9. A display analyzer according to claim 8, wherein: said analyzing means is operable to alter said supporting means adjustment signal to bring said target into the field of view of said detection means, said analyzing means being responsive to displacement of the image from said unit under test with respect to said reference target.

10. A display analyzer according to claim 1, wherein: the unit under test has a sensor responsive to ambient light to alter the intensity of the image from said unit under test, and wherein said analyzing means includes: a light source detachably mountable at said sensor for stimulating the sensor.

11. A display analyzer according to claim 10 wherein: said analyzing means is operable to apply a stimulus signal to said light source to alter its intensity, said analyzing means being operable to produce said information in response to said viewing signal varying to an extent bearing a relation to the variation of said stimulus signal.

12. A display analyzer according to claim 11, further comprising: a light calibrator responsive to said light source for producing a calibrated signal signifying the intensity of said light source, said analyzing means being operable to change said relation in response to said calibrated signal.

13. A method for analyzing a display image from a unit under test with the output signal of a detection device having a given field of view, comprising the steps of:
moving said detection device into a given position and measuring the position of said detection device;
determining if the output signal of said detection device satisfies a selectable standard when said detection device is stationary; and
altering the angular position of said detection device with respect to said image.

14. A method according to claim 13 comprising the steps of:
altering the angular position of said detection device until the output signal of said detection device satisfies said selectable standard.

15. A method according to claim 13 comprising the steps of:
projecting a target image before said detection device;
aligning said field of view onto said target; and
measuring position of said detection device with respect to said target image.

16. A display analyzer for analyzing an image from a unit under test, comprising:
a detection means for scanning a given field of view to produce a video signal, said video signal varying in time to represent the intensity of picture elements within said field of view, said video signal having a given waveshape in response to the appearance of a given image in the center of said field of view, said detection means having sufficient resolution to detect said given image;
supporting means for adjustably supporting said detection means, said supporting means having at least two angular and two linear degrees of freedom;
two position transducers for measuring displacement with respect to said two angular degrees of freedom and two other position transducers for measuring displacement with respect to said two linear degrees of freedom, the transducers producing four transducer signals signifying said displacement;
a projector means for projecting a visual reference target before said detection means; and
analyzing means for producing a supporting means adjustment signal, said supporting means being operable to move in response to said adjustment signal, said analyzing means being operable to produce information in response to production of said given waveshape when the values of said transducer signals are within a given range.

* * * * *